United States Patent
Nakashima

(12) 
(10) Patent No.: US 6,443,872 B1
(45) Date of Patent: Sep. 3, 2002

(54) APPARATUS FOR PROTECTING AUTOMATIC CLUTCH FROM OVERHEATING

(75) Inventor: Masami Nakashima, Kobe (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/846,279

(22) Filed: May 2, 2001

(30) Foreign Application Priority Data

Oct. 12, 2000 (JP) .................................. 2000-312120

(51) Int. Cl.[7] .............................................. B60K 41/02
(52) U.S. Cl. ..................... 477/174; 477/177; 477/178; 477/179; 477/181
(58) Field of Search ................................ 477/174, 175, 477/177, 178, 179, 181

(56) References Cited

U.S. PATENT DOCUMENTS

| | | | |
|---|---|---|---|
| 4,425,992 A | * 1/1984 | Makita | 477/177 |
| 4,632,231 A | * 12/1986 | Hattori et al. | 477/177 |
| 4,662,491 A | * 5/1987 | Takefuta et al. | 477/177 |
| 5,184,301 A | * 2/1993 | Stasell | 477/181 |
| 5,491,630 A | * 2/1996 | Genise et al. | 477/78 |
| 5,510,982 A | * 4/1996 | Ohnishi et al. | 477/120 |
| 5,823,912 A | * 10/1998 | Fischer et al. | 477/97 |
| 6,059,691 A | * 5/2000 | McDonald et al. | 477/176 |

FOREIGN PATENT DOCUMENTS

JP 6-89795 11/1994 ........... F16D/37/02

* cited by examiner

*Primary Examiner*—Sherry Estremsky
(74) *Attorney, Agent, or Firm*—Sughrue Mion, PLLC

(57) ABSTRACT

An apparatus for protecting an automatic clutch from overheating, capable of holding down the generation of heat in the clutch even when the condition in which a traveling load at a vehicle starting time exceeds a predetermined level continues for a predetermined period of time. The automatic clutch is provided in a transmission path extending between an internal combustion engine and a transmission adapted to change a speed represented by an output from the internal combustion engine. The apparatus comprises a control unit adapted to receive signal outputs from a pressure sensor for detecting a pressure in an intake manifold of the internal combustion engine, a degree of opening of accelerator sensor for detecting an operation amount of an accelerator and a vehicle speed sensor for detecting a traveling speed of a vehicle, to detect a traveling load at a vehicle starting time, and to move and close the throttle valve to a position of a predetermined set level by operating a throttle actuator when the condition in which the traveling load is not lower than a predetermined level and the traveling speed is not higher than a predetermined value.

3 Claims, 5 Drawing Sheets

APPARATUS FOR PROTECTING AUTOMATIC CLUTCH FROM OVERHEATING

BACKGROUND OF THE INVENTION

1. Field of the Invention

This invention relates to a control apparatus for an automatic clutch mounted on a vehicle, and more particularly to an apparatus for protecting the automatic clutch from overheating.

2. Description of the Related Art

In order to engage a clutch when starting an automatic-clutch-mounted vehicle, the clutch is controlled so that a smooth engagement thereof can be attained, by gradually increasing transmission torque of the clutch in accordance with a rotational speed of an internal combustion engine and a vehicle speed. During this time, a semi-clutch-engaged condition is necessarily continued as a clutch engaging force is increased from an engagement starting time to an engagement completion time. In this semi-clutch-engaged condition, the clutch is in a slipping state, so that heat is generated greatly. When a traveling load at a vehicle starting time is large, the semi-clutch-engaged condition continuation time increases, and this causes the burning of the clutch in some cases. In order to prevent such burning of a clutch, various kinds of measures are taken. For example, the techniques disclosed in Japanese Laid-Open Patent No. 89795/1994 constitute an example of these measures.

According to the techniques disclosed in this publication, a judgement that a traveling load is large is given when not shorter than a predetermined period of time has elapsed after the arrival of the time at which a vehicle started at such a level of rotational frequency of an internal combustion engine that is in the vicinity of a stall point is to reach a set vehicle speed, and a signal the level of which corresponds to the length of the mentioned time elapsed is outputted so as to increase in a current setting unit of an electromagnetic clutch the gradient of the rising characteristics of a clutch current with respect to a rotational speed of the internal combustion engine. Namely, when a traveling load is judged large, the engagement of the clutch is effected earlier by hastening the increasing of a clutch current, and a slipping period is thereby shortened. This prevents the heat from doing damage to the clutch.

Thus, in a related art clutch, the measures for preventing the burning of the same by hastening the engagement thereof are taken. Such techniques are effective when the weight onboard is increased, and when a vehicle runs up a slope. However, an increase in a traveling load is encountered not only in such a case. Such a load increase also occurs when a parking brake is not disengaged, and when the starting of a vehicle is prevented by objects of a larger height, such as a vehicle stops which the vehicle cannot get over. When the above-mentioned system having a function of protecting a vehicle from overheating is put in operation in such cases, the clutch is controlled so that it is forcibly engaged. This causes brakes to be overheated, the momentary overheating of the clutch to occur, or a shock and an engine failure to occur.

SUMMARY OF THE INVENTION

The present invention has been made in view of the above-mentioned circumstances, and provides an apparatus for protecting an automatic clutch from overheating, capable of holding down the heating of the clutch by minimizing an output from an internal combustion engine when a traveling load exceeds a predetermined level with this excessive load condition continuing for a predetermined period of time, and thereby returning the operation of the engine to a normal condition without stopping the engine.

According to an aspect of the present invention, the apparatus for protecting an automatic clutch from overheating, wherein the automatic clutch is provided in a power transmission path between an internal combustion engine mounted on a vehicle and a transmission adapted to change a speed represented by an output from the engine, the apparatus comprising:

a pressure sensor adapted to detect a pressure in an intake manifold of the internal combustion engine, a degree of opening of accelerator sensor adapted to detect an operation amount of an accelerator, a vehicle speed sensor adapted to detect a traveling speed of a vehicle, and a control unit adapted to detect a traveling load of the vehicle at a vehicle starting time on the basis of the outputs of the pressure sensor, the degree of opening of accelerator sensor, and the vehicle speed sensor, and to control a throttle actuator by which a throttle valve provided in the intake manifold of the internal combustion engine is operated, wherein the control unit being adapted to control the throttle valve so that the throttle valve is moved to and closed in a position of a preset level when the traveling load is not lower than a predetermined level with the vehicle speed continuing to be not higher than a predetermined value for a period of time not shorter than a predetermined period of time, and thereby protect the automatic clutch.

On the basis of such a structure, the throttle valve is closed in a predetermined period of time even when a vehicle is tried to be started in a case where the starting of the vehicle is hindered by an unreleased parking brake or a block which the vehicle cannot get over. This enables the generation of heat ascribed to the continuation of a slipping condition of the automatic clutch to be held down, and the burning of the clutch to be prevented.

According to another aspect of the present invention, the apparatus for protecting an automatic clutch from overheating, wherein, when the condition in which the traveling load is not lower than the predetermined level and the vehicle speed is not higher than the predetermined value continues for the predetermined period of time, the control unit operates the throttle valve being closed so that an internal combustion engine attains an idling rotational speed, and the automatic clutch thereby release to disconnect the internal combustion engine and the transmission.

On the basis of such a structure, the generation of heat in and the burning of the automatic clutch can be prevented, and a subsequent operation can be carried out without accompanying an engine stall.

According to still another aspect of the present invention, the apparatus for protecting an automatic clutch from overheating, wherein an electromagnetic powder clutch is used as the automatic clutch.

On the basis of such a structure, the above-mentioned operation for protecting the clutch from heating can be carried out with a high accuracy by simple electric circuit and program.

BRIEF DESCRIPTION OF THE DRAWINGS

Preferred embodiments of the present invention will be described in detail with reference to the following figures, wherein.

DESCRIPTION OF THE PREFERRED EMBODIMENTS

[Embodiment 1]

Figure 1:
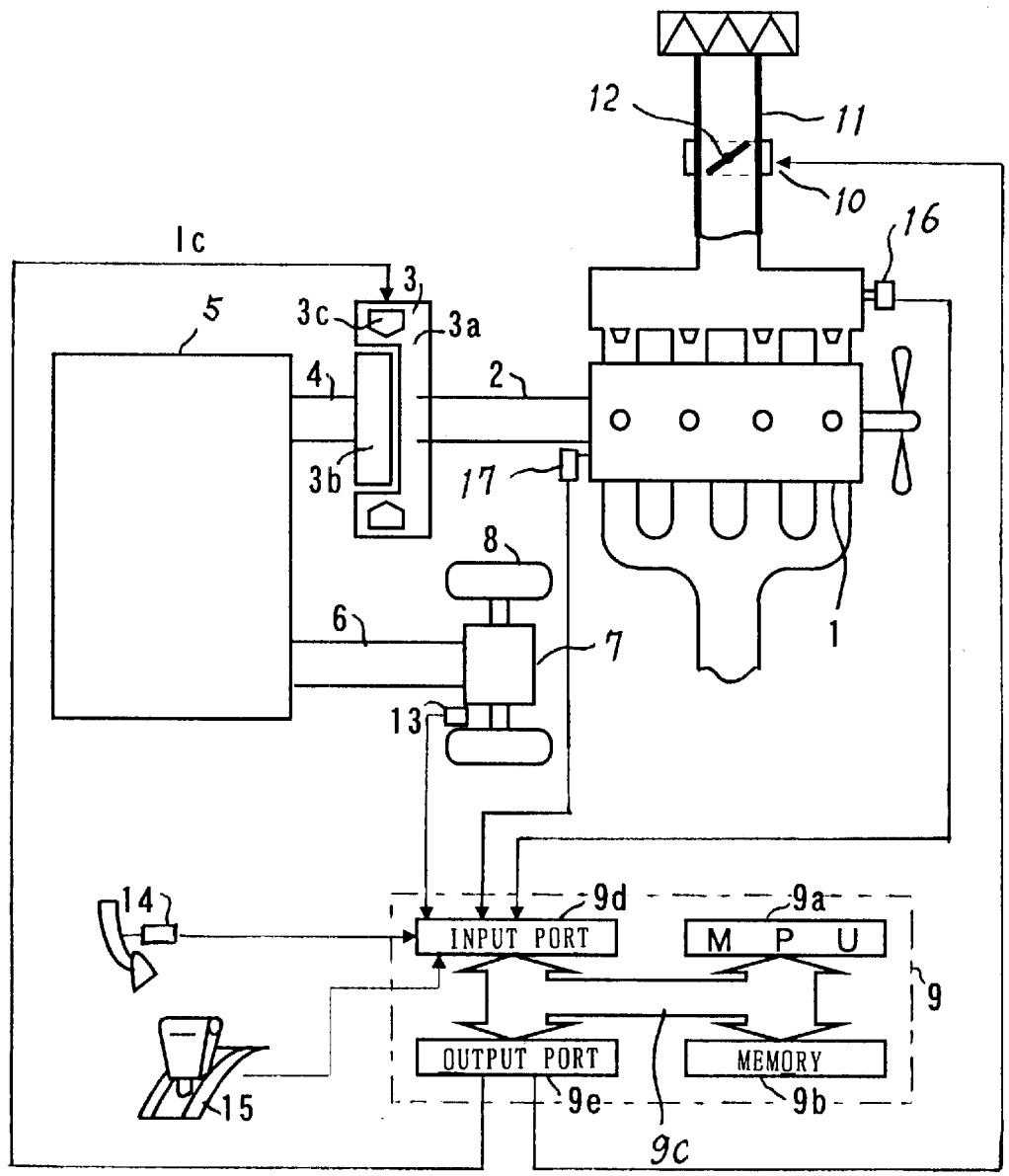
FIG. 1 is a construction diagram of a system describing one embodiment of the apparatus for protecting an automatic clutch from overheating according to the present invention.

FIGS. 1–4 are drawings for describing the embodiment 1 of the apparatus for protecting an automatic clutch from overheating according to the present invention. FIG. 1 is a construction diagram of a system of a vehicle mounted with an automatic clutch, FIG. 2 a diagram showing function blocks of a control unit, FIG. 3 a flow chart of an operation for judging a traveling load, and FIG. 4 a flow chart of a throttle control operation. Referring to the drawings, a reference numeral 1 denotes an internal combustion engine mounted on a vehicle, 2 an output shaft of the internal combustion engine 1, which is connected to a drive member 3a of an electromagnetic clutch 3, 4 an output shaft of the clutch 3, by which a driven member 3b of the electromagnetic clutch 3 and a transmission 5 are connected together, 3c an exciting coil of the electromagnetic clutch 3, 6 a propeller shaft by which the transmission 5 and a differential gear 7 are connected together, and 8 a driving wheel of the vehicle. An electromagnetic powder clutch capable of easily controlling a force for combining the drive member 3a and driven member 3b together in accordance with a current value of the exciting coil 3c is used as the electromagnetic clutch 3.

Figure 2:
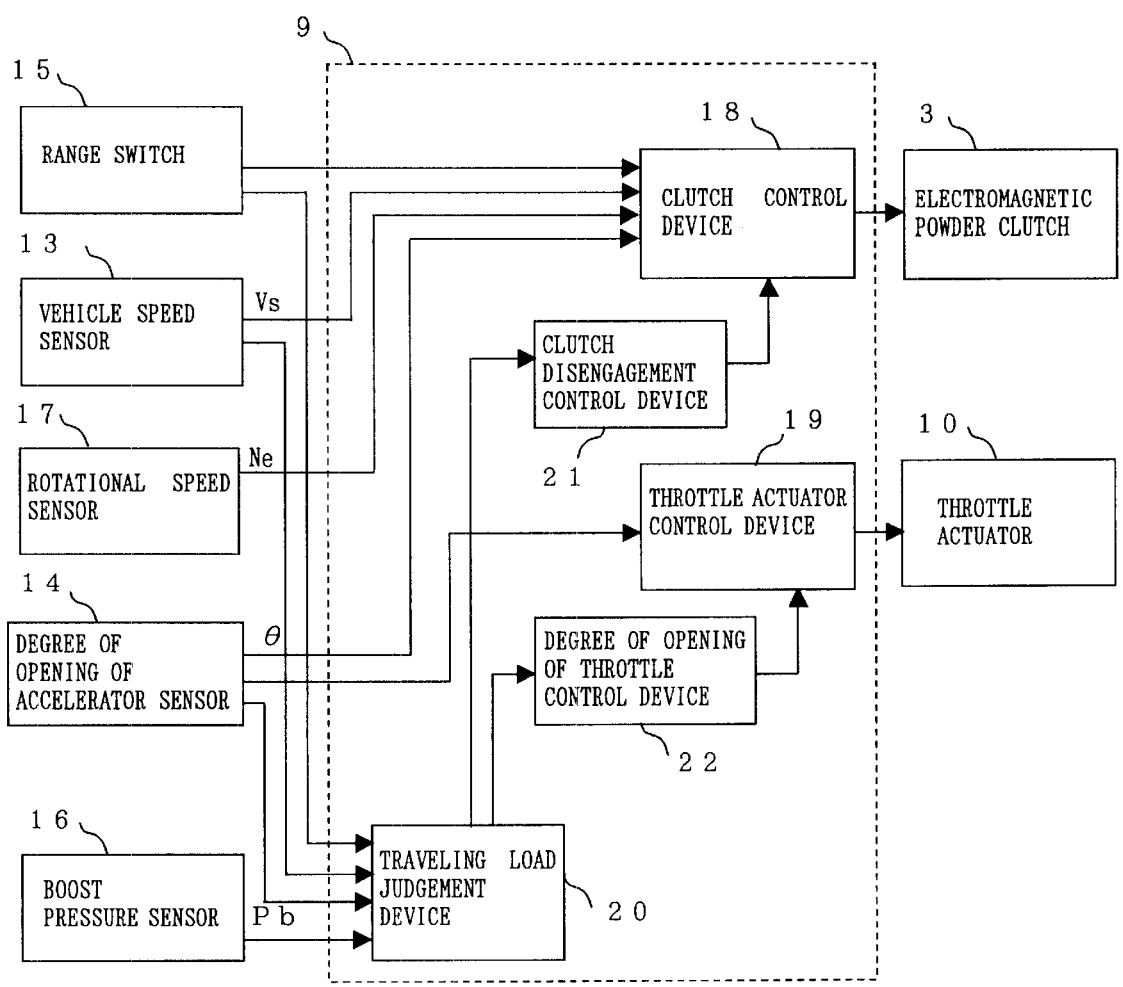
FIG. 2 is a diagram showing function blocks of a control unit for one embodiment of the apparatus for protecting an automatic clutch from overheating according to the present invention.

A reference numeral 9 denotes a control unit including a microprocessor 9a, a memory 9b, bus line 9c, an input port 9d and an output port 9e, and having a function block which will be described later, and which is shown in FIG. 2. A reference numeral 10 denotes a throttle actuator adapted to control a flow rate of suction air by regulating a degree of opening of a throttle valve 12 provided in a suction passage 11 of the internal combustion engine, 13 a vehicle speed sensor adapted to detect a traveling speed of the vehicle, 14 a degree of opening of accelerator sensor adapted to detect an amount of operation of the accelerator, 15 a shift range switch adapted to detect a position of a shift lever, 16 a boost pressure sensor adapted to detect a pressure in an intake manifold of the internal combustion engine 1, and 17 a rotational speed sensor adapted to detect a rotational speed of the internal combustion engine 1. The control unit 9 is adapted to receive at the input port 9d signal outputs from these sensors, and output from the output port 9e a driving signal to the throttle actuator 10 and electromagnetic clutch 3 in accordance with a program stored in the memory 9b.

The function blocks of the control unit 18 includes as shown in FIG. 2 a clutch control device 18, a throttle actuator control device 19, a traveling load judgement device 20, a clutch disengagement control device, and a degree of opening of throttle control device 22.

The clutch control device 18 is adapted to receive an output signal from the shift range switch 15, an output signal Vs from the vehicle speed sensor 13, an output signal Ne from the rotational speed sensor 17 and an output signal θ from the degree of opening of accelerator sensor 14. The clutch control device 18 judges whether the transmission of torque is required or not on the basis of information from the shift range switch 15, and judges that the clutch is in a semi-engaged (slipping) state or in a directly engaged state on the basis of outputs Vs, Ne, θ from the vehicle speed sensor 13, rotational speed sensor 17 and degree of opening of accelerator sensor 14 respectively. When a vehicle is started, transmission torque corresponding to output torque from the internal combustion engine 1 which is calculated on the basis of signals from the degree of opening of accelerator sensor 14 and rotational speed sensor 17 is generated. Therefore, an exciting current of the exciting coil 3c is controlled on the basis of a predetermined operation expression. The exciting current is increased in accordance with an increase in a rotational frequency of the internal combustion engine 2, and the electromagnetic clutch 3 is thereby smoothly engaged.

The throttle actuator control device 19 is adapted to receive an output signal θ from the degree of opening of accelerator sensor 14 and a judgement output from the traveling load judgement device 20, control the throttle actuator 10 in accordance with an accelerator pedal stepping amount, regulate the degree of opening of the throttle valve 12, maintain when releasing the accelerator the degree of opening of the throttle valve 12 at an idling level so that a rotational speed of the internal combustion engine 1 is maintained at a stable idling level, and control when a signal is inputted from the traveling load judgement device 20 as will be described later the throttle valve 12 so that the throttle valve 12 is moved to and closed in a predetermined position.

The traveling load judgement device 20 is adapted to receive an output signal from the shift range switch 15, an output signal Pb from the boost pressure sensor 16, an output signal Vs from the vehicle speed sensor 13 and an output signal θ from the degree of opening of accelerator sensor 14. This judgement device is adapted to judge that a traveling load of a vehicle is large when the condition having the shift range switch in a traveling range and a boost pressure at a high level with an increase in a vehicle speed corresponding to the degree of opening of the accelerator impossible to attain continues for a predetermined period of time, and supply a signal of the judgement to the degree of opening of throttle control device 22. When the degree of opening becomes smaller than a return judgement level, the judgement that the traveling load is large is canceled.

The degree of opening of throttle control device 22 is adapted to supply a signal to the throttle actuator control device 19 when a signal of judgement that the traveling load is large is inputted from the traveling load judgement device 20 thereinto, lower output torque from the internal combustion engine 1 by moving and closing the throttle valve 12 to and in a position of a predetermined degree of opening, and thereby hold down the generation of heat ascribed to the slipping of the electromagnetic clutch 3.

Figure 3:
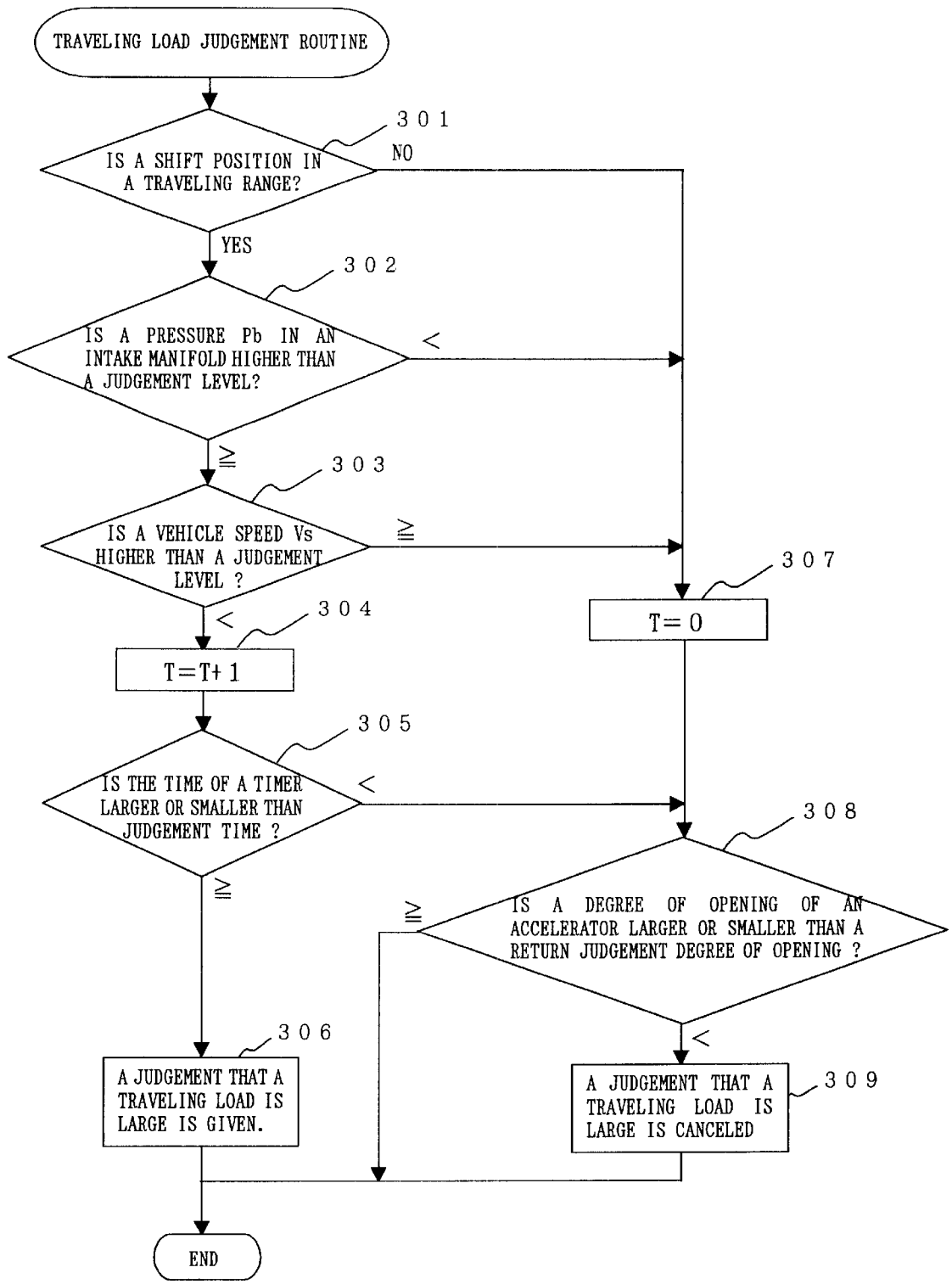
FIG. 3 is a flow chart describing an operation of one embodiment of the apparatus for protecting an automatic clutch from overheating according to the present invention.

A judgement by and actions of the embodiment 1 of the apparatus for protecting an automatic clutch from overheating according to the present invention thus constructed are made as follows. First, a judgement made by the traveling load judgement device is as shown in the flow chart of FIG. 3. Referring to FIG. 3, a shift position is judged from an output signal from the shift range switch 15 as to whether the shift position is in a traveling range or not in Step 301. When the shift position is in neither a parking range (which will hereinafter be referred to P) nor a neutral range (which will hereinafter be referred to N), the operation is advanced to Step 302. In Step 302, the pressure in the intake manifold is judged on the basis of an output signal Pb from the boost pressure sensor 16 as to whether the pressure is higher than a judgement level or not. When this pressure is not lower than a level at which a load of the engine 1 can be judged high, the operation is advanced to Step 303.

In Step 303, a vehicle speed Vs is read from an output from the vehicle speed sensor 13. When the vehicle speed is lower than a predetermined level at which a judgement that the vehicle does not travel can be given, a judgement that there is the possibility that a traveling load is large is given, and the operation is advanced to Step 304. In Step 304, 1 is added to a timer T adapted to judge the condition of the traveling load, and the time of this timer and judgement time are compared with each other in Step 305. This routine is repeated for a predetermined period of time. Therefore, when the condition in which the traveling load is large continues, the addition in Step 304 keeps being made, and the time of the timer compared with the judgement time in Step 305 becomes larger than the judgement time. When the time of the timer exceeds the judgement time, the operation is advanced to Step 306, and the traveling load is judged large.

When the shift range is P or N in Step 301, the operation is advanced to Step 307, and the timer T is cleared. When the pressure in the intake manifold is not higher than a predetermined level in Step 302, or when the vehicle speed is not lower than a predetermined level in Step 303, the operation is also advanced to Step 307, and the timer T is cleared. when the timer T is cleared in Step 307, the operation is advanced to Step 308. When the time of the timer T is not higher than a judgement level in Step 305, the operation is also advanced to Step 308. In Step 308, the degree of opening of the accelerator is judged on the basis of an output signal θ from the degree of opening of accelerator sensor 14. When the degree of opening of the accelerator is lower than a preset return judgement level, the judgement that the traveling load is large is canceled in Step 309. When the degree of opening of the accelerator is higher than the return judgement level, the judgement that the traveling load is large is maintained.

Figure 4:
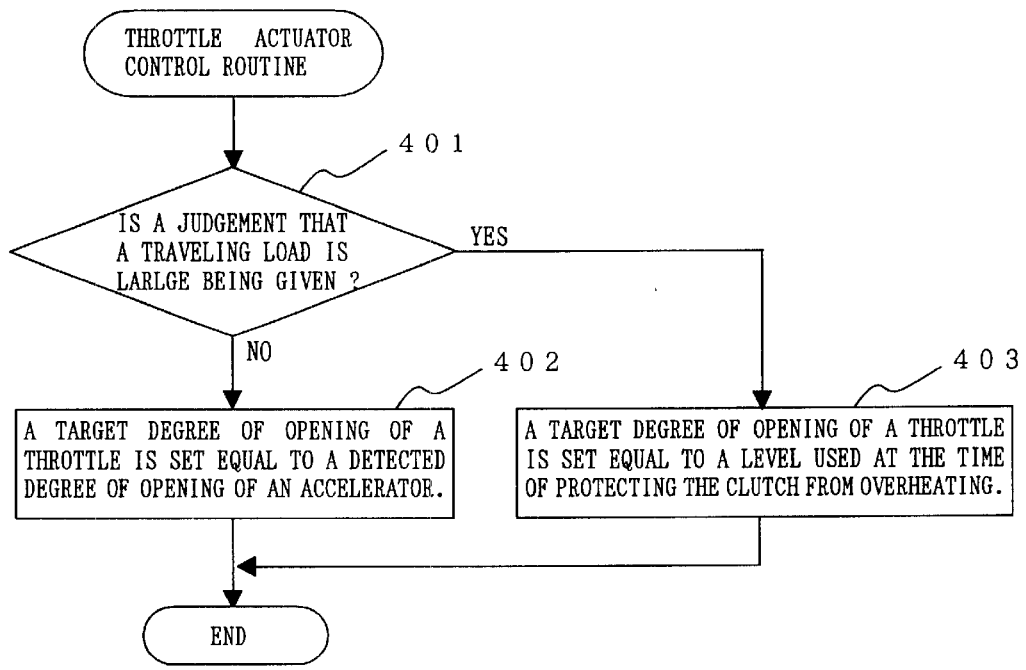
FIG. 4 is a flow chart describing an operation of one embodiment of the apparatus for protecting an automatic clutch from overheating according to the present invention.

A control routine of the throttle actuator control device 19 is as shown in FIG. 4. First, in Step 401, whether or not the results of judgement in Step 306 of the traveling load judgement routine indicates that the traveling load is large is detected on the basis of a signal from the degree of opening of throttle control device 22. When a judgement that the traveling load is large is not given, the operation is advance to Step 402, and a target degree of opening of the throttle valve 12 is set to a level detected by the degree of opening of accelerator sensor 14. When a judgement that the traveling load is large is given, the operation is advanced to Step 403, and the target degree of opening of the throttle valve 12 is set to a set level used during an operation for protecting the automatic clutch from overheating, output torque from of the internal combustion engine being thereby lowered.

Thus, in the embodiment 1 of the apparatus for protecting an automatic clutch from overheating according to the present invention, the traveling load judgement device 20 predictively judges by a traveling load judgement routine whether the automatic clutch 3 is ready to be overheated or not. The results of this judgement are outputted to the throttle actuator control device 19. When the overheating of the clutch is not predicted, a throttle control operation corresponding to the degree of opening of the accelerator is carried out. When the overheating of the clutch is predicted, the throttle valve 12 is moved to and closed in a position of a set degree of opening to reduce output torque from the engine 1. Accordingly, even when a traveling load at the vehicle starting time becomes large due to an obstacle, so that the starting of the vehicle is prevented, the burning of the automatic clutch 3 can be avoided.

[Embodiment 2]

Figure 5:
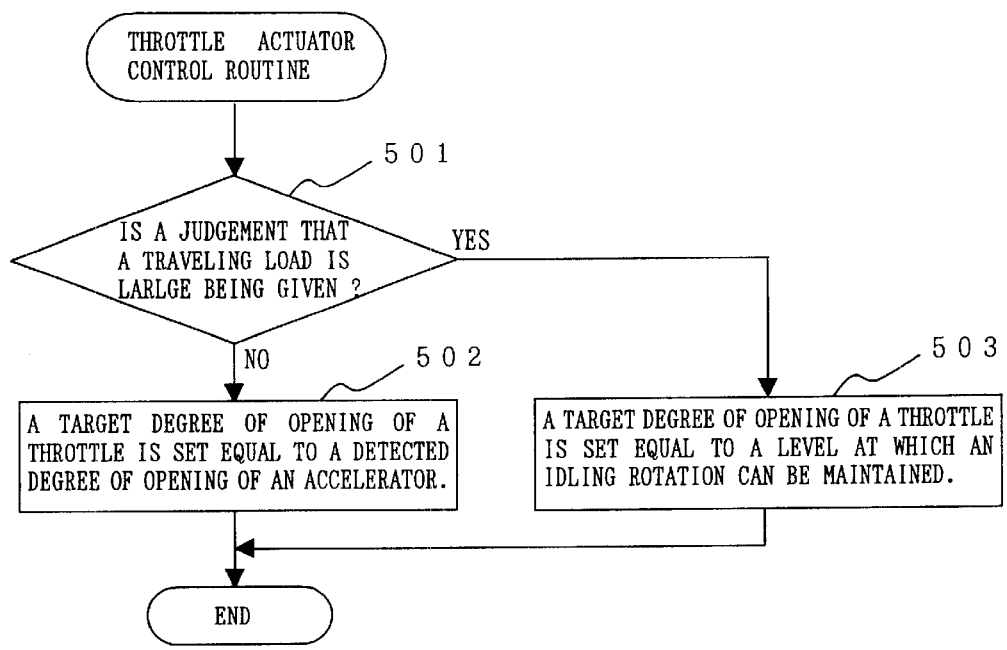
FIG. 5 is a flow chart describing an operation of an another embodiment of the apparatus for protecting an automatic clutch from overheating according to the present invention.
Figure 6:
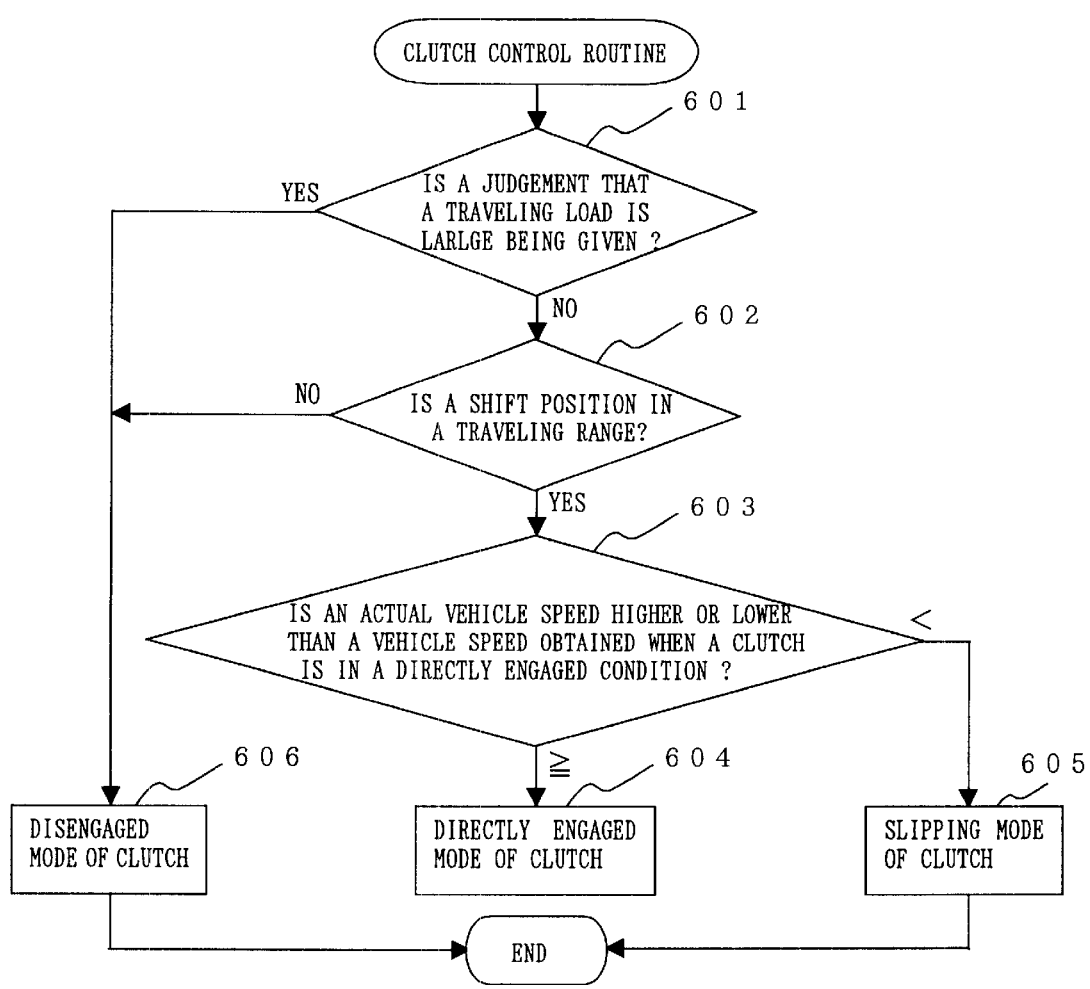
FIG. 6 is a flow chart describing an operation of the another embodiment of the apparatus for protecting an automatic clutch from overheating according to the present invention.

FIG. 5 is a flow chart of a throttle control operation describing the embodiment 2 of the apparatus for protecting an automatic clutch from overheating according to the present invention, and FIG. 6 a flow chart of a clutch control operation. This embodiment 2 is formed as follows. When the traveling load judgement device 20 judges that the traveling load is large in the embodiment 1, the judgement device 20 supplies a signal to a degree of opening of throttle control device 22 and a clutch disengagement control device 21. Consequently, a throttle actuator control device 19 sets a degree of opening of a throttle valve 12 to a level of the idling rotation of the engine 1 in accordance with a signal from the degree of opening of throttle control unit 22, and a clutch control device 18 disengages an electromagnetic clutch 3 in accordance with a signal from the clutch disengagement control device 21.

In a throttle control routine of FIG. 5, whether or not the results of judgement in Step 306 in the traveling load judgement routine described with reference to FIG. 3 for the embodiment 1 indicate that the traveling load is large is detected in Step 501. When a judgement that the traveling load is large is not given, the operation is advanced to Step 502, and a target degree of opening of the throttle valve 12 is set to a level detected by a degree of opening of accelerator sensor 14. When the traveling load is judged large in Step 501, the operation is advanced to Step 503, and the target degree of opening of the throttle valve 12 is set to a level at which the engine 1 can continue to make an idling rotation stably.

At the same time, in a control routine of FIG. 6, whether or not the results of judgement in a traveling load judgement routine indicate that the traveling load is large is detected in Step 601. When a judgement that the traveling load is large is not given, whether or not a shift position is in a traveling range is judged in Step 602 on the basis of a signal from a shift range switch 15. When the shift position is neither in a P range nor in a N range, the operation is advanced to Step 603. In Step 603, an actual vehicle speed is compared with a vehicle speed attained when the clutch is directly engaged. When the actual vehicle speed is not lower than the vehicle speed a directly engaged condition, a judgement that the clutch is in a direct engagement mode is given in Step 604. When the actual vehicle speed is lower than the vehicle speed in a directly engaged condition, a judgement that the clutch is in a slipping mode in which a semi-clutch-engaged condition at a vehicle starting time is controlled is given in Step 605.

When a judgement that a traveling load is large is given in Step 601, it is identical with the judgement given in the above-mentioned traveling load judgement routine in Step 306. Therefore, the operation is advanced to Step 606, in which the clutch control device 18 changes the mode of the electromagnetic clutch 3 into a disengagement mode. When a judgement that the shift range is a P range or a N range is given in Step 602, the operation is also advanced to Step 606, and the mode of the electromagnetic clutch 3 is changed into a disengagement mode.

When a judgement that a traveling load is large is thus predictively given in this embodiment of the apparatus for protecting an automatic clutch from overheating, the rotation of the internal combustion engine 1 is controlled to be an idling rotation in accordance with a signal from the degree of opening of throttle control device 22, and the electromagnetic clutch 3 is controlled to be disengaged in accordance with a signal from the clutch disengagement control device 21. Therefore, just as in the case of the embodiment 1, the burning of the automatic clutch 3 can be avoided even when a traveling load at the vehicle starting time becomes large. Moreover, since the electromagnetic clutch 3 is disengaged, a subsequent normal operation can be carried out without accompanying an engine stall.

Although the above description of the control operation of the control device 9 is narrowed down to a description of only the controlling of a traveling load, the control unit 9 also carries out the controlling of the transmission 5, and the controlling of the electromagnetic clutch 3 and throttle actuator 10, which is incidental to the controlling of the transmission 5, on the basis of inputs of various kinds of sensors and a control program stored in the memory 9b.

What is claimed is:

1. An apparatus for protecting an automatic clutch from overheating, wherein the automatic clutch is provided in a power transmission path between an internal combustion engine mounted on a vehicle and a transmission adapted to change a speed represented by an output from the engine, the apparatus comprising:

a pressure sensor adapted to detect a pressure in an intake manifold of the internal combustion engine, a degree of opening of accelerator sensor adapted to detect an operation amount of an accelerator, a vehicle speed sensor adapted to detect a traveling speed of a vehicle, and a control unit adapted to detect a traveling load of the vehicle at a vehicle starting time on the basis of the outputs of the pressure sensor, the degree of opening of accelerator sensor, and the vehicle speed sensor, and to control a throttle actuator by which a throttle valve provided in the intake manifold of the internal combustion engine is operated, wherein the control unit being adapted to control the throttle valve so that the throttle valve is moved to and closed in a position of a preset level when the traveling load is not lower than a predetermined level with the vehicle speed continuing to be not higher than a predetermined value for a period of time not shorter than a predetermined period of time, and thereby protect the automatic clutch.

2. The apparatus for protecting an automatic clutch from overheating according to claim 1, wherein, when the condition in which the traveling load is not lower than the predetermined level and the vehicle speed is not higher than the predetermined value continues for the predetermined period of time, the control unit operates the throttle valve being closed so that an internal combustion engine attains an idling rotational speed, and the automatic clutch thereby release to disconnect the internal combustion engine and the transmission.

3. The apparatus for protecting an automatic clutch from overheating according to claim 1, wherein an electromagnetic powder clutch is used as the automatic clutch.

* * * * *